(12) United States Patent
Leibold

(10) Patent No.: US 7,707,721 B2
(45) Date of Patent: May 4, 2010

(54) MODULAR TRANSMISSION SYSTEM

(75) Inventor: Hubert Leibold, Forst (DE)

(73) Assignee: SEW-EURODRIVE GmbH & Co., Bruchsal (DE)

( * ) Notice: Subject to any disclaimer, the term of this patent is extended or adjusted under 35 U.S.C. 154(b) by 0 days.

(21) Appl. No.: 12/057,255

(22) Filed: Mar. 27, 2008

(65) Prior Publication Data

US 2008/0172877 A1     Jul. 24, 2008

Related U.S. Application Data

(63) Continuation of application No. 10/221,925, filed as application No. PCT/EP01/00023 on Jan. 3, 2001.

(30) Foreign Application Priority Data

Mar. 20, 2000  (DE) ............................... 100 13 785

(51) Int. Cl.
B23P 15/14   (2006.01)
(52) U.S. Cl. ................. 29/893.1; 29/893; 29/893.2; 74/416; 74/417; 74/420; 74/424; 74/424.5; 74/425; 74/458
(58) Field of Classification Search ............. 29/893.1; 72/416, 420; 74/417, 420, 424, 416, 425, 74/458, 424.5
See application file for complete search history.

(56) References Cited

U.S. PATENT DOCUMENTS

| | | | |
|---|---|---|---|
| 2,037,890 A | | 4/1936 | Dow |
| 3,645,148 A | | 2/1972 | Schrempp |
| 3,977,268 A | | 8/1976 | Seabrook |
| 4,226,136 A | * | 10/1980 | Porter et al. ............ 74/416 |
| 4,242,923 A | | 1/1981 | Nishikawa et al. |
| 5,501,117 A | | 3/1996 | Mensing et al. |
| 5,634,374 A | * | 6/1997 | Depietri ................. 74/420 |
| 6,626,059 B1 | | 9/2003 | Fischer et al. |

FOREIGN PATENT DOCUMENTS

DE     43 09 559     9/1994

(Continued)

OTHER PUBLICATIONS

Sew Eurodrive, Operation Instructions Transmission R.F.K.S.W., pp. 7-11 (May 2001).

(Continued)

*Primary Examiner*—Rick K Chang
(74) *Attorney, Agent, or Firm*—Crowell & Moring LLP

(57) ABSTRACT

In a method of manufacturing multiple transmission units with individually selectable gear ratios that vary from unit to unit, a gear pair having a desired transmission ratio is selected from a multiplicity of interchangeable gear pairs that includes both spiroplan gears and conventional crown gear and pinion combinations. The selected gear pair is then installed into a housing having first and second bearing sections configured to support bearings in which the shafts of the selected gear pair are rotatably mounted. The bearing sections are configured such that, for every gear pair that may be selected from among the multiplicity of gear pairs, the bearing sections support the first and second shafts in such a position and orientation that teeth of the gears engage with each other and a longitudinal axis of one of the gears of the gear pair is offset by a fixed distance from a longitudinal axis of the other. The fixed distance is maintained at a constant value which does not vary with or depend on the tooth configuration of the gear pair that is selected. A modular transmission system is thus provided, which can achieve a wide range of gear ratios, by an appropriate selection of interchangeable gear pairs, without need of modification of the basic components of the apparatus.

5 Claims, 4 Drawing Sheets

FOREIGN PATENT DOCUMENTS

| | | |
|---|---|---|
| DE | 197 33 546 | 4/1999 |
| EP | 0 557 961 A1 | 9/1993 |
| EP | 0 632 213 | 1/1995 |
| GB | 2 052 676 | 1/1981 |
| JP | 6-280946 | 10/1994 |
| WO | WO 94/10482 | 5/1994 |

OTHER PUBLICATIONS

Mensing. "The alternative angular gear motor". *Der Konstructeur*, pp. 30-32 (Dec. 1995).

Bryant et al. "Which right-angle gear system". In Chironis (Ed.) *Gear Design and Application*, New York, McGraw-Hill Book Company, pp. 44-55 (1967).

Darle. *Handbook of Practical Gear Design*. USA: Donneley & Sons Co., S. 1.49-1.51, S.243-254, S.3.59 3.60 (1984).

Niemann et al. "Maschinenelemente". Berlin: Spring, pp. 22-23 (1983).

Eurotrans. European Committee of the Professional Association of the Produces and Transmissions and Drive Elements. Berlin: Springer, pp. 131 (1982).

\* cited by examiner

MODULAR TRANSMISSION SYSTEM

This application is a continuation of U.S. application Ser. No. 10/221,925, filed Sep. 17, 2002 which is a national stage of PCT International Application No. PCT/EP2001/000023, filed Jan. 3, 2001, which claims priority under 35 U.S.C. §119 to German Patent Application No. 100 13 785.7, filed Mar. 20, 2000, the entire disclosure of which is herein expressly incorporated by reference.

The invention relates to a modular transmission system such as is often employed in motive power engineering, in particular to adapt the rotational speed and the driving torque of an electric motor for a particular purpose, e.g. for use in a mechanical installation. Here the problem arises that depending on the intended application, a great variety of transmission ratios should be achievable with as little complexity as possible, by means of only a few specific motors (or even only a single motor).

BACKGROUND OF THE INVENTION

A transmission system of this kind is disclosed, for example, in the patent DE 197 33 546 C1. In that publication it is proposed to construct at least one gear module as an angular gear, which can be combined with a plurality of drive modules. The angular gear module is specified as a crown gear, the crown wheel of which is adapted to engage each of the output pinions of a drive motor. However, if it is desired to encompass very large ranges of transmission ratios, with the known transmission modules several gear housings must be provided, because crown gears customarily allow transmission ratios to vary merely within a range of about 1-6. The additional transmission stages (with spur wheels) proposed in that publication also allow only limited variation within a single housing.

Another modular transmission system is known from the patent EP 0 557 961 B1. As input stage an axially offset angular gear is proposed, specifically a bevel gear, and as the subsequent additional transmission stages cylindrical gears are shown. The problem area associated with this system corresponds to that described above. In particular, it is also impossible here to accommodate a very large range of transmission ratios.

One object of the present invention is to provide a modular transmission system that in a simple manner permits a large range of transmission ratios.

This and other objections and advantages are achieved by the modular transmission system according to the invention, in which one and the same housing accommodates either a spiroplan transmission stage or a crown-gear transmission stage, while employing the same offset and the same bore. The particular advantage here is the large range of transmission ratios that results, because a spiroplan transmission stage and a crown-gear transmission stage enable transmission ratios to vary widely. The ratios for a crown-gear stage are about 1-6, while those for a spiroplan stage are 6-200. Overall, then, with this modular system a transmission-ratio range of 1-200 can be covered with only one transmission stage in a single housing.

Regarding the spiroplan gearing, it should be noted that here the term is meant to denote gearings belonging to the category of angular gears. These are employed to transmit power between intersecting or crossing shafts. From a kinematic viewpoint, this is a spiral bevel gearing that resembles a worm-gear mechanism, except that unlike a worm gear, in this case a cylindrical worm meshes with a planar crown wheel as mating gear and not with a globoid worm wheel. The offset provided here is achieved by a curved longitudinal configuration of the teeth of the wheel. A spiroplan gearing is described, for example, in the applicant's patent DE 43 09 559.

In contrast, the crown-gear arrangement (according to Nieman Winter, Vol. III, Section 24.1.3) amounts kinematically to a pair of bevel gears in which the profile displacements change along the width of the teeth, in such a way that a cylindrical pinion and a planar crown wheel as mating wheel are produced. In the case of a straight-toothed pinion and axial offset the longitudinal tooth-flank shape of the wheel is a straight line, whereas with an oblique-toothed pinion it is curved.

In particular, therefore, the proposed solution of the problem cited above is a modular transmission system with least one structural element, encased in a housing, that comprises a plurality of gearings with different transmission ratios, in each of which there is a first transmission stage that comprises an angular gear with axial offset incorporating an input drive pinion that meshes with a planar crown wheel having teeth that project parallel to the axis. In this system the axial offset is the same for all the transmission stages in a given structural element, and there are provided at least one first pinion with a first such planar crown wheel having a crown-gear tooth configuration and a second pinion with a second such planar crown wheel having a spiroplan tooth configuration.

Preferably the housing also includes a second transmission stage that is rotationally connected to the input drive stage and that comprises at least two cylinder gears. This enables the range of transmission ratios to be expanded.

In a first preferred embodiment the planar crown wheel in the first transmission stage is connected by way of a common bearing shaft to a pinion in the second transmission stage, so that the angular gear constitutes an input drive stage. Especially advantageous in this regard is the fact that when running rapidly, this transmission stage makes less noise than would be achievable with cylinder or bevel gears. Given that an angular stage is always more expensive than a cylinder-gear stage of the same size, a saving in expense is also obtained, because the site of action of the lower torque can be of smaller dimensions. A tooth-bearing adjustment like that for worm-gear or bevel-gear mechanisms is thus not needed here.

In another embodiment of the invention an output wheel of the second transmission stage is connected to the input drive pinion of the first transmission stage, by way of a common bearing shaft, so that the angular gear forms an output-drive stage. The advantage of this arrangement lies in the fact that the cylinder gears already available in standard kits (in particular those supplied by the applicant) can be used, so that their transmission-ratio variability can be exploited economically. Nevertheless, by this means only two or three different transmission ratios of the output angular-gear stage (in particular spiroplan stage) are needed to provide a sufficient range of ratios. Here, again, the construction of the transmission system is simple and requires no tooth-bearing adjustment such as is required for worm- or conical-gear mechanisms. The result is an especially shock-absorbing and low-noise operation. Another important point in this regard is that the axial offset of the pinion makes room for the cylinder-gear transmission stage, so that the system as a whole can be of particularly flat construction.

In particular in the embodiment in which the angular gear constitutes the output drive stage, it is advantageous for the housing to contain apparatus for flange-mounting a motor, such that the input-drive cylinder gear of the second stage is attached to an output shaft of the motor. This construction is especially economical and compact.

Altogether, the axial offset preferably amounts to between $2/10$ and $4/10$ of the diameter of the planar crown wheel.

Other objects, advantages and novel features of the present invention will become apparent from the following detailed description of the invention when considered in conjunction with the accompanying drawings.

DETAILED DESCRIPTION OF THE INVENTION

Figure 1:
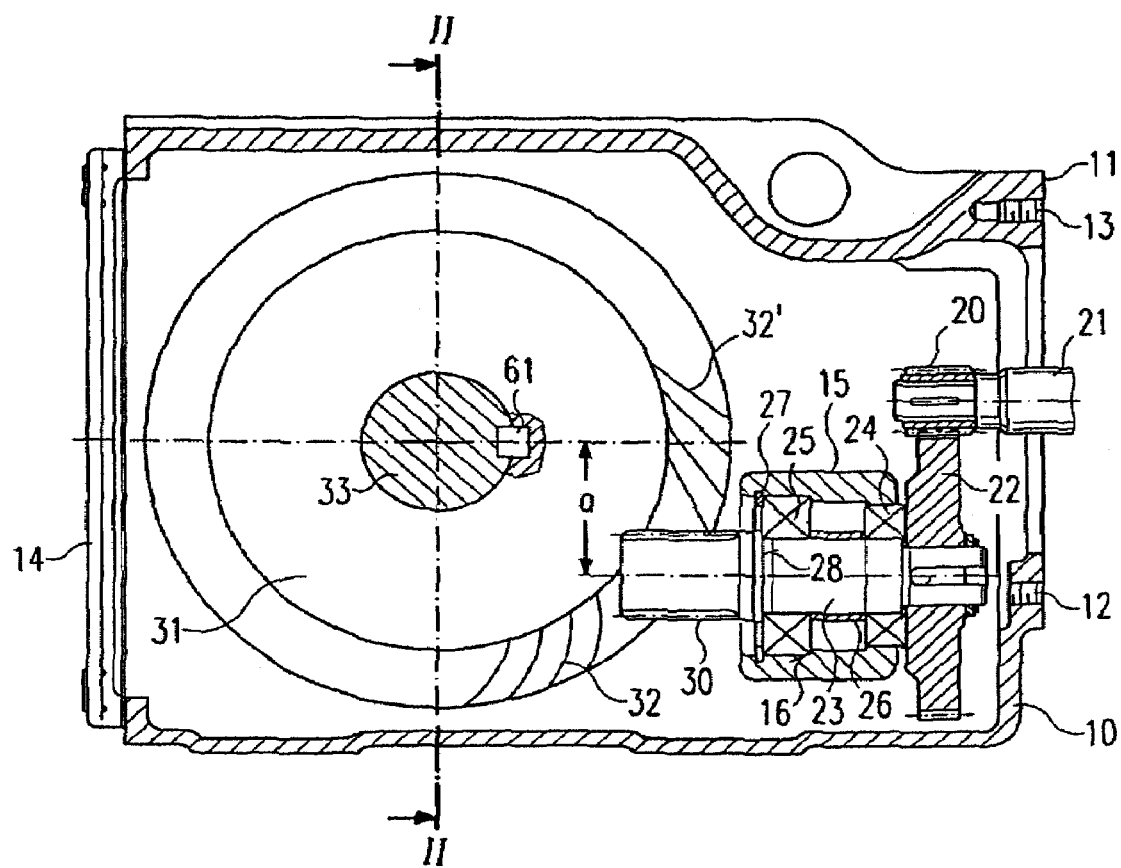
FIG. 1 is a longitudinal section of a first preferred embodiment of the invention, in which a first stage of the transmission system comprises a pair of cylinder gears.

In the following description, the same reference numerals are used for identical parts or parts with identical actions.

Figure 2:
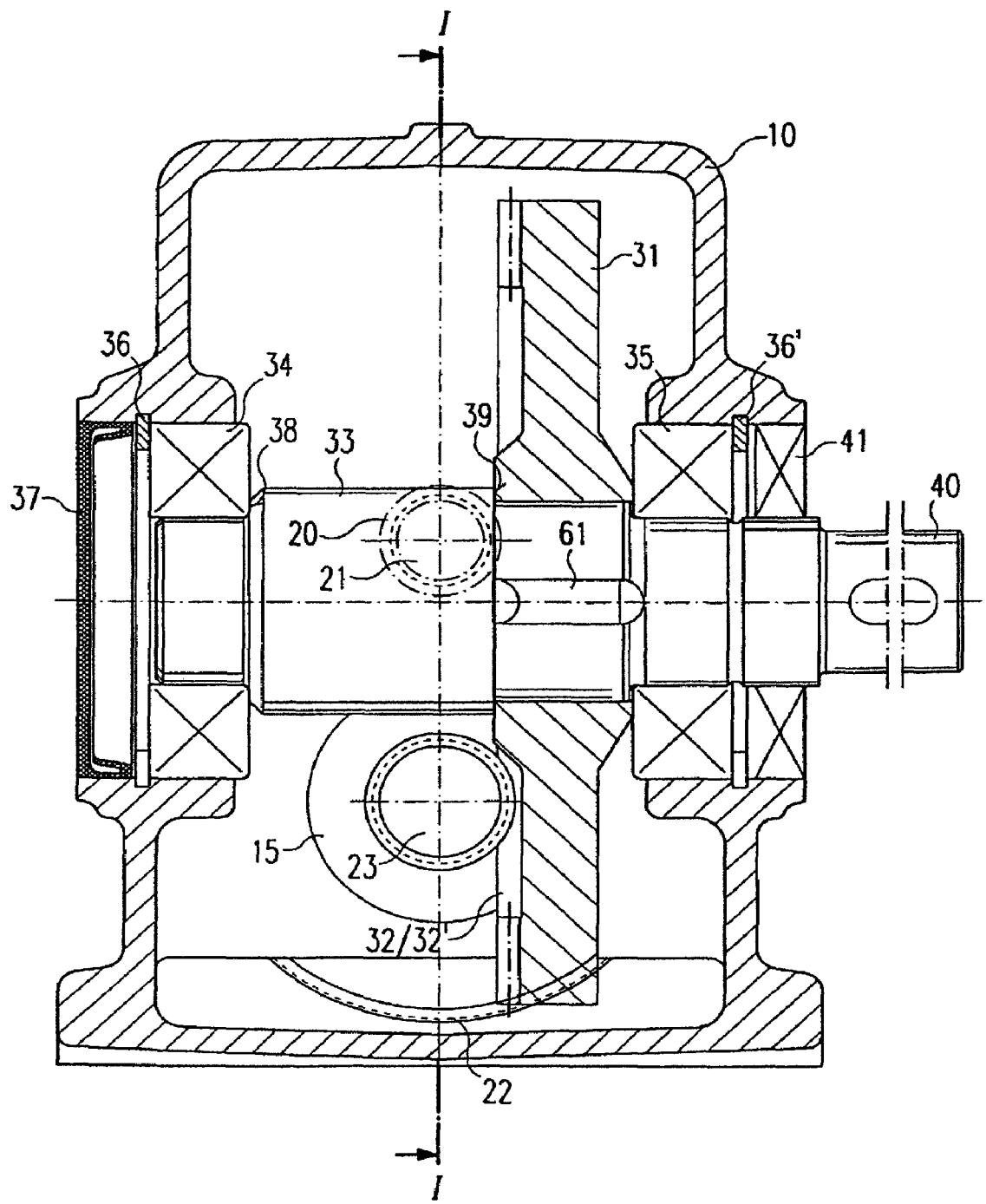
FIG. 2 is a schematic sectional view of the transmission system shown in FIG. 1 along the line II-II.

As can be seen in FIGS. 1 and 2, a housing is provided that comprises on one side a flange 11 for mounting an electric motor (not shown here), for the attachment of which bores 12, 13 are provided in the housing 10. To make the interior of the housing accessible a cover 14 is provided, which is fixed firmly to the housing 10 by means of threaded bolts (not shown) and sealing devices. When a motor has been mounted on the housing, a cylindrical pinion 20 attached to a motor shaft 21 projects into the housing 10 through its open side next to the flange 11. The cylindrical pinion 20 meshes with a cylinder gear 22 that is splined onto a first shaft 23, which is supported in a bearing section 15 of the housing 10 by way of a first bearing 24 and a second bearing 25. The first bearing 24 abuts with one outer surface against the cylinder gear 22 and with an inner surface against a spacer 26, the other end of which contacts a first end face of the second bearing 25. The second bearing 25 is attached between a shoulder 16 of the bearing section 15 and a retaining ring 27, while the first shaft 23 is opposed by a shoulder 28 to the surface of the second bearing 25 that faces away from the cylinder gear 22. In this way the shaft 23 is secured against axial displacement within the bearing section 15.

At its end opposite the cylinder gear 22 the first shaft 23 is provided with an angular-gear pinion 30, the teeth of which mesh with those of a planar crown gear 31. The latter can have teeth configured in either spiroplan form 32 or crown-wheel form 32', depending on the desired transmission ratio. The shapes of the tooth flanks indicated in FIG. 1 are meant to illustrate this circumstance, in that the toothflank configuration labeled 32' represents a crown-wheel gearing with straight-toothed pinion, whereas when an oblique-toothed pinion is used for a crown-wheel gearing, the tooth flanks would be curved. In both cases, i.e., both when the angular-gear pinion 30 and the planar crown wheel 31 are provided with a spiroplan tooth configuration 32 and when the two tooth configurations correspond to a crown-wheel gearing 32', an offset a is provided between the axis of the shaft 23 and that of a second shaft 33 of the planar crown wheel 31. That is, the only difference here is between the tooth geometries of the planar crown wheel 31 and the pinion 30, the other components being identical; nevertheless, widely differing transmission ratios can be obtained (as is known per se) with these two tooth-flank shapes.

The second shaft 33 of the planar crown wheel 31 is supported within the housing 10 by way of a third bearing 34 and a fourth bearing 35. One outer surface of the third bearing 34 contacts a retaining ring 36 seated in the housing 10. In the embodiment shown here a cover 37 is provided to cover the third bearing 34. The third bearing 34 also makes contact with a first shoulder 38 of the shaft 33, so that fixation of the shaft 33 in the axial direction (toward the left in FIG. 2) is ensured.

The planar crown wheel 31 is apposed to a second shoulder 39 of the shaft 33 and is nonrotatably fixed to the shaft 33 by means of a spline 61. On its side opposite the second shoulder 39 the planar crown wheel 31 makes contact with one side of the fourth bearing 35, which on its other side rests against a retaining ring 36' that is fixed within the housing 10. As a result, the shaft 33 and the planar crown wheel 31 are secured against movement in the axial direction within the housing 10, by means of the bearings 34 and 35.

The shaft 33 comprises an output drive stud 40, which passes through a sealing ring 41 set into the housing 10. A machine element that is to be driven can be splined onto the output stud 40. As can readily be seen in FIG. 2, the shaft 33 can also be provided with two output drive studs if the cover 37 is removed and, instead, a second seal is provided at this end. An arrangement opposite to that shown in FIG. 2, in which the output drive stud 40 projects leftward and the cover 37 is seated on the right side, is of course also possible, because the housing 10 is symmetrically constructed in this respect.

Figure 3:
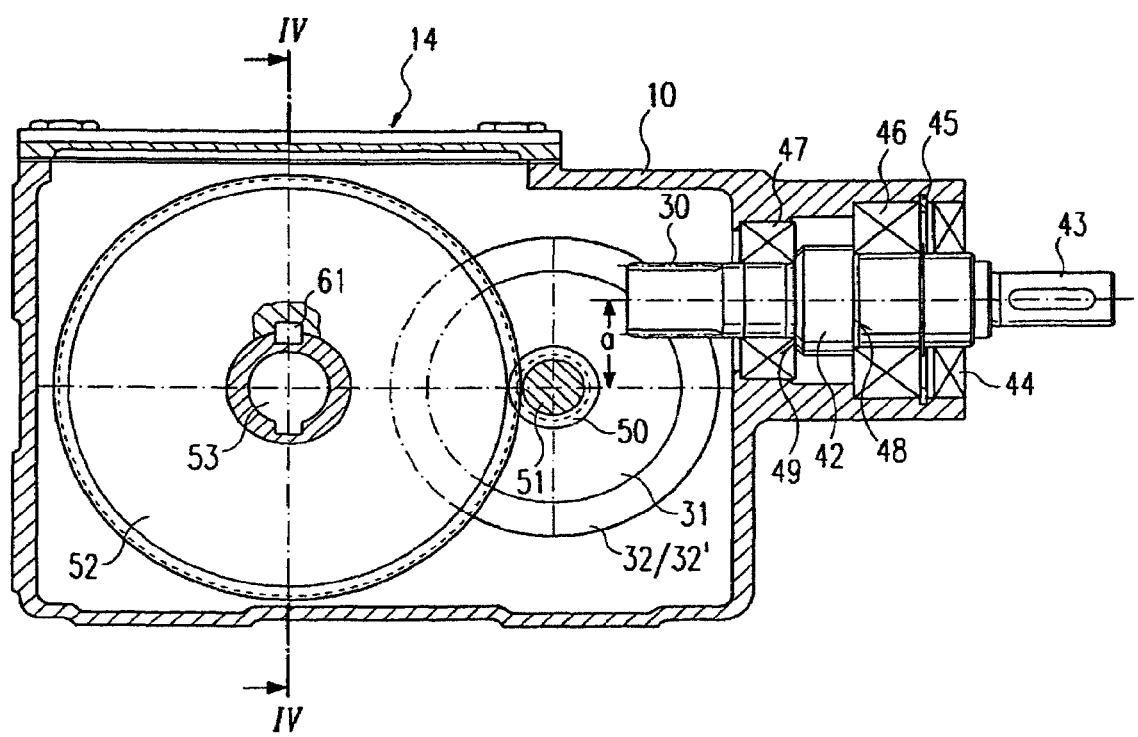
FIG. 3 is similar to FIG. 1 but of a second embodiment of the invention in which an input drive stage of the transmission system is an angular gear.
Figure 4:
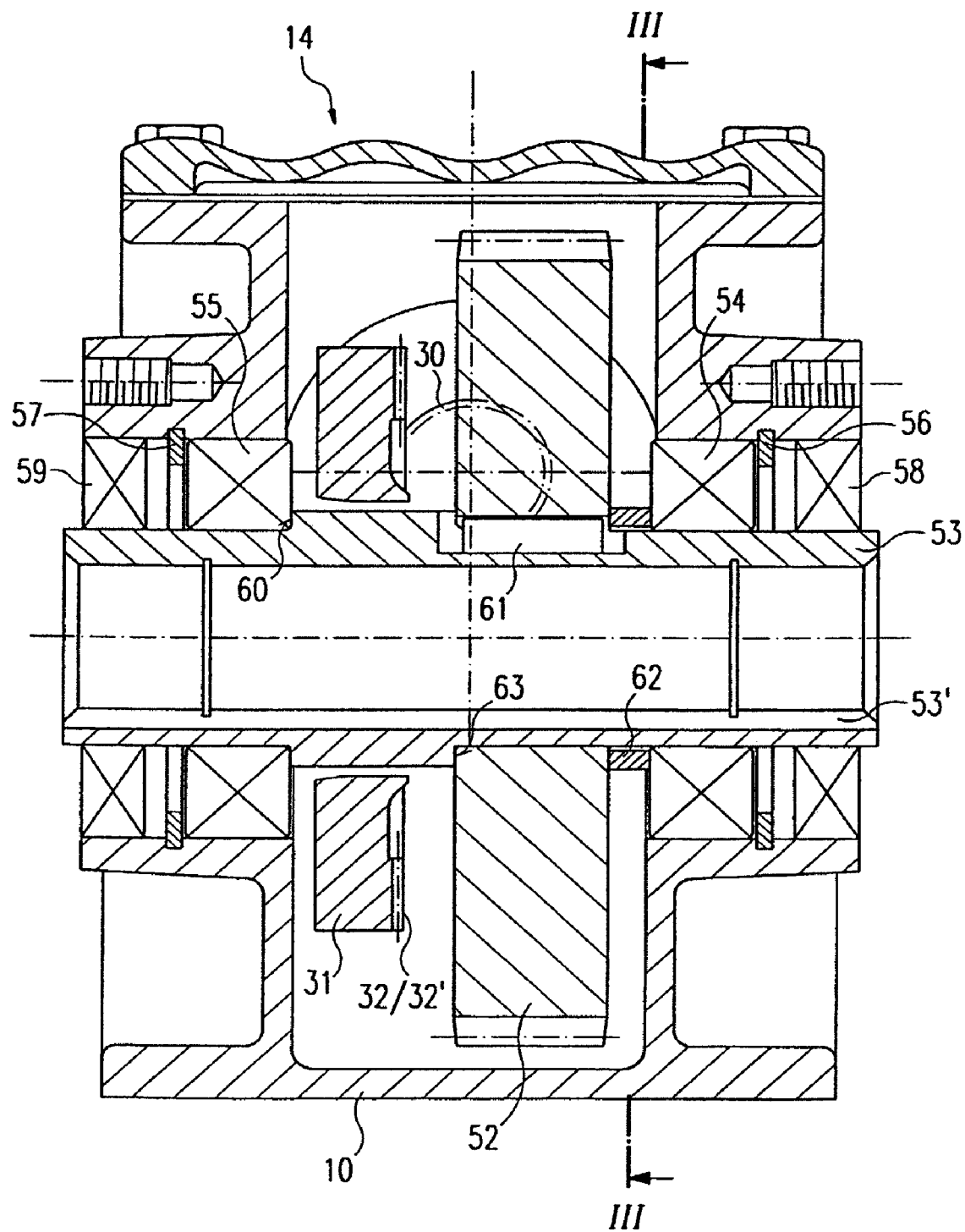
FIG. 4 is a section through the transmission system of FIG. 3 along the line IV-IV.

The embodiment of the invention shown in FIGS. 3 and 4 differs in principle from that in FIGS. 1 and 2 with respect to the order in which angular gear and cylinder gear are disposed. That is, in the embodiment shown in FIGS. 3 and 4 an input drive shaft 42 is provided that comprises a drive stud 43 projecting out of the housing 10, onto which a driving element can be splined. The input drive shaft 42 is sealed to the housing 10 by a sealing ring 44 and is supported by an outer bearing 46 and an inner bearing 47. The outer bearing 46 is seated between a shoulder in the housing 10 and a retaining ring 45 and abuts against a first shoulder 48 on the input drive shaft 42. The inner bearing 47 is apposed to a second shoulder 49 of the input drive shaft 42 and on the other side, to a shoulder of the housing 10. In this way the input drive shaft 42 is fixed within the housing 10 so that it cannot be moved in the axial direction.

At its other end, opposite the drive stud 43, the input drive shaft 42 is provided with the angular-gear pinion 30, which—depending on the particular embodiment—can have a spiroplan or a crown-wheel tooth configuration, as explained above. The angular-gear pinion 30 meshes with the teeth 32 or 32' of the planar crown gear 31, which is seated on a shaft 51 to which is also fixed a first cylinder gear 50; hence the cylinder gear 50 and the planar crown wheel 31 are connected so that they cannot rotate with respect to one another.

The first cylinder gear 50 meshes with a second cylinder gear 52, which is nonrotatably fixed to a drive shaft 53 by means of a spline 61. The drive shaft 53 is constructed as a hollow shaft, throughout which runs a longitudinal groove 53' that can be used to spline into place an element that is to be driven. The drive shaft 53 is seated in the housing by way of a first bearing 54 and a second bearing 55. At its outer surface the first bearing 54 makes contact with a retaining ring 56 that is seated in the housing 10. On its other side, the first bearing is opposed to a spacer 62 which in turn is opposed to the second cylinder gear 52. The second cylinder gear 52 rests against a shoulder 63 of the drive shaft 53.

The second bearing 55 contacts with its outer surface a second retaining ring 57 seated in the housing 10. On its other side the second bearing 55 makes contact with a shoulder 60 of the drive shaft 53, so that the drive shaft 53 and the second cylinder gear 52 mounted thereon are secured against axial displacement. For sealing the drive shaft 53, at its two ends seals 58 and 59 are provided.

The exemplary embodiments of the invention described above each display individual elements that are interchangeable between the two embodiments. In particular, for example, it is possible in the second embodiment of the invention, shown in FIGS. 3 and 4, also to dispose the angular-gear pinion 30 directly on the shaft of an input drive motor and to provide the housing 10 with a flange 11 and bores 12, 13 for direct flange-mounting of the motor, as is shown in FIGS. 1 and 2. It is likewise possible in the embodiment according to FIGS. 1 and 2 to replace the flange 11 and the attachment bores 12, 13 by the input drive shaft 42 shown in FIGS. 3 and 4, with its bearing in the housing and the drive stud 43 for connection to external apparatus as desired.

Furthermore, the construction of the drive shaft 53 as a hollow shaft as shown in FIGS. 3 and 4 can be applied in the embodiment according to FIGS. 1 and 2 and, conversely, the unilateral arrangement of the drive shaft according to FIGS. 1 and 2 is applicable in the embodiment according to FIGS. 3 and 4. As a result, a modular transmission system with extreme versatility is created. In particular the cylinder-gear transmission stages can be composed of cylinder gears such as are provided in the cylinder-gear transmission modules that are already widely available, so that a broad palette of transmission ratios can be implemented at low cost. Because the angular gear can be employed with either a spiroplan or a crown-wheel tooth configuration, the range of transmission ratios becomes extremely broad.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Housing
11 Flange
12 Bore
13 Bore
14 Cover
15 Bearing section
16 Shoulder
20 Cylindrical pinion
21 Motor shaft
22 Cylinder gear
23 First shaft
24 First bearing
25 Second bearing
26 Spacer
27 Retaining ring
28 Shoulder
30 Angular-gear pinion
31 Planar crown wheel
32 Spiroplan tooth configuration
32' Crown-wheel tooth configuration
33 Second shaft
34 Third bearing
35 Fourth bearing
36 Retaining ring
36' Retaining ring
37 Cover
38 First shoulder
39 Second shoulder
40 Output drive stud
41 Sealing ring
42 Input drive shaft
43 Input drive stud
44 Sealing ring
45 Retaining ring
46 Outer bearing
47 Inner bearing
48 First shoulder
49 Second shoulder
50 First cylinder gear
51 Shaft
52 Second cylinder gear
53 Output drive shaft
53' Groove
54 First bearing
55 Second bearing
56 First retaining ring
57 Second retaining ring
58 First seal
59 Second seal
60 Shoulder
61 Spline
62 Spacer
63 Shoulder

What is claimed is:

1. A method of manufacturing multiple transmission units having individually selectable gear ratios that vary from unit to unit, said method comprising:

providing a multiplicity of interchangeable gear pairs, each gear pair comprising a crown wheel carried on a first shaft and a pinion gear carried on a second shaft, said gear pairs having differing tooth configurations and providing differing gear ratios;

providing a housing having therein first and second bearing sections configured respectively to support, within said housing, bearings that are rotably mounted on the first and second shafts of a gear pair selected from said multiplicity of interchangeable gear pairs;

selecting, from among said multiplicity of interchangeable gear pairs, a gear pair having a desired transmission ratio; and installing the selected gear pair in the first and second bearing sections in said housing; wherein said first and second bearing sections are configured such that, for every gear pair that may be selected from among said multiplicity of interchangeable gear pairs, said first and second bearing sections support said first and second shafts in such a position and orientation that i) teeth of the pinion gear engage with teeth on a face of said crown wheel, ii) a longitudinal axis of said first shaft is offset by a fixed distance from a longitudinal axis of said second shaft, and iii) said fixed distance is maintained at a constant value which does not vary with or depend on the tooth configuration of the gear pair that is selected;

said multiplicity of interchangeable gear pairs includes i) gear pairs with a crown wheel having longitudinally curved tooth flanks and a cylindrical, oblique toothed pinion, and ii) gear pairs in which said crown wheel and said pinion have a spiroplan configuration;

said bearing sections are configured to accept gear pairs having gear ratios that vary throughout a range of approximately 1-200, the respective gear pairs in said multiplicity of interchangeable gear pairs are dimensioned and configured such as to permit said selected gear pair to be exchanged for a different gear pair chosen from among said multiplicity of interchangeable gear pairs, for installation in said first and second bearing sections in place of said selected gear pair.

2. The method according to claim 1, wherein:
said bearing sections comprise openings integrated into an internal portion of said housing; and
said openings have respective diameters that correspond to respective diameters of each of said bearings for all pairs of gears that are included in said multiplicity of interchangeable gear pairs, whereby said gear pairs are interchangeably mountable within said openings.

3. A method of manufacturing a transmission unit, said method comprising:
providing a housing having bearing sections formed in an interior thereof;
installing a gear pair in said bearing sections, said gear pair comprising a crown wheel carried on a first shaft and a pinion gear carried on a second shaft; wherein,
said gear pair is selected from among a multiplicity of interchangeable gear pairs;
each of said first and second shafts has a bearing mounted rotatably thereon;
said bearings on said gear pairs have a uniform size and configuration that conforms with a size and configuration of said bearing sections, such that said gear pairs are interchangeably mountable within said housing;
said bearing sections are disposed and configured within said housing such that for every gear pair that may be selected from among said multiplicity of interchangeable gear pairs, said first and second bearing sections support said first and second shafts in such a position and orientation that i) teeth of the pinion gear engage with teeth on a face of said crown wheel, ii) a longitudinal axis of said first shaft is offset by a fixed distance from a longitudinal axis of said second shaft, and iii) said fixed distance is maintained at a constant value which does not vary with or depend on the tooth configuration of the gear pair that is selected;
said multiplicity of interchangeable gear pairs includes i) gear pairs with a crown wheel having longitudinally curved tooth flanks and a cylindrical, oblique toothed pinion, and ii) gear pairs in which said crown wheel and said pinion have a spiroplan configuration; and
said bearing sections are configured to accept gear pairs having gear ratios that vary throughout a range of approximately 1-200, the respective gear pairs in said multiplicity of interchangeable gear pairs are dimensioned and configured such as to permit said selected gear pair to be exchanged for a different gear pair chosen from among said multiplicity of interchangeable gear pairs, for installation in said first and second bearing sections in place of said selected gear pair.

4. The method according to claim 1, wherein:
said multiplicity of interchangeable gear pairs includes
  i) at least a first gear pair with a crown wheel having longitudinally curved tooth flanks and a cylindrical, oblique toothed pinion; and
  ii) at least a second gear pair with a crown wheel having longitudinally curved teeth and a cylindrical pinion having a worm configuration;
said first gear pair is any one of said plurality of interchangeable gear pairs whose gear ratios vary throughout a range of approximately 1-6; and
said second gear pair is any one of said plurality of interchangeable gear pairs whose gear ratios vary throughout a range of approximately 6-200.

5. The method according to claim 3, wherein said multiplicity of interchangeable gear pairs includes:
  i) at least one first gear pair with a crown wheel having longitudinally curved tooth flanks and a cylindrical, oblique toothed pinion; and
  ii) at least one second gear pair with a crown wheel having longitudinally curved teeth and a cylindrical pinion having a worm configuration;
said first gear pair is any one of said plurality of interchangeable gear pairs whose gear ratios vary throughout a range of approximately 1-6; and
said second gear pair is any one of said plurality of interchangeable gear pairs whose gear ratios vary throughout a range of approximately 6-200.

* * * * *